United States Patent [19]

Tedesco et al.

[11] 4,046,082
[45] Sept. 6, 1977

[54] TROUGH HATCH LOCKING DEVICE

[75] Inventors: George A. Tedesco; Marvin Stark, both of Michigan City, Ind.

[73] Assignee: Pullman Incorporated, Chicago, Ill.

[21] Appl. No.: 595,818

[22] Filed: July 14, 1975

[51] Int. Cl.² .................................................. B61D 39/00
[52] U.S. Cl. .................................... 105/377; 292/128; 292/256.5
[58] Field of Search ................. 105/377; 292/128, 123, 292/126, 256, 256.5; 114/203, 177, 201 R, 201 A, 203

[56]  References Cited
U.S. PATENT DOCUMENTS

| 978,658 | 12/1910 | Schnell | 292/128 |
|---|---|---|---|
| 2,161,542 | 6/1939 | Titus | 292/128 |
| 2,835,211 | 5/1958 | Abel | 105/377 |
| 3,472,194 | 10/1969 | Rozanski | 114/203 |

FOREIGN PATENT DOCUMENTS 645,803  7/1962  Canada ................. 105/377

Primary Examiner—Albert J. Makay
Assistant Examiner—Randolph A. Reese
Attorney, Agent, or Firm—Richard J. Meyers

[57] ABSTRACT

A locking device for railway hopper cars having continuous trough hatch openings and a plurality of associated hinged covers arranged end-to-end. Hold-down arms, also pivotally mounted, are positioned to overlap and seal adjacent hatch cover ends. Each hold-down arm has a spring loaded, locking latch with a keeper hook for automatically engaging an associated keeper lug mounted to the hopper car adjacent the hatch opening. The locking hatch has an upper flange that may be foot engaged to unlock the hold-down arm by pivoting the locking latch to disengage the keeper hook from the keeper lug.

9 Claims, 4 Drawing Figures

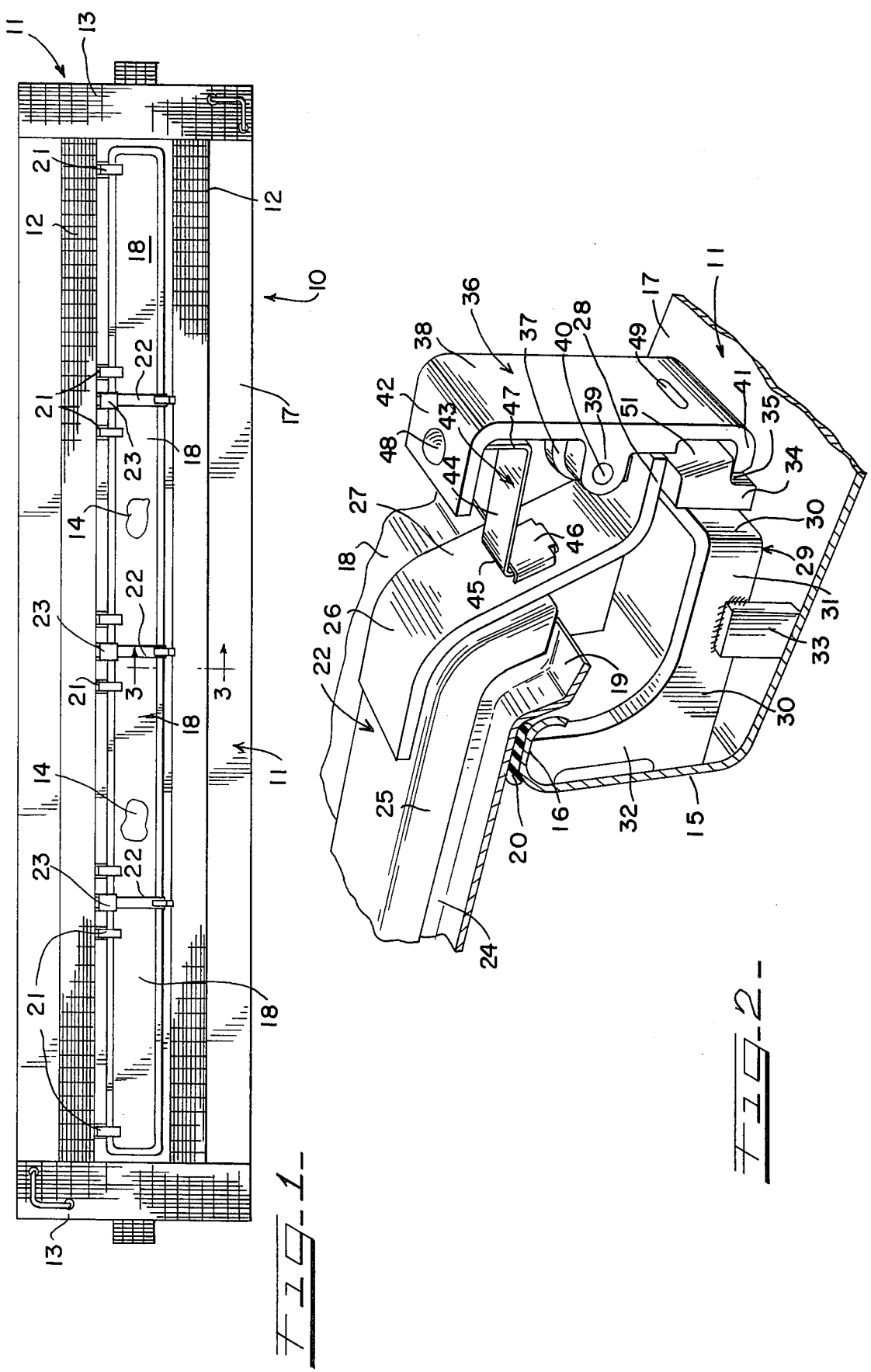

TROUGH HATCH LOCKING DEVICE

BACKGROUND OF THE INVENTION

1. Field of the Invention

This invention relates to railway hopper cars and in particular to those having a longitudinally extending hatch opening which is closed by means of a plurality of longitudinally and adjacent trough hatch covers. A plurality of hinged hold-down arms are adapted to secure the covers in a closed and locked position.

2. Description of the Prior Art

The prior art is disclosed in U.S. Pat. Nos. 3,552,324, 2,873,696 and 3,800,714. In order to expedite the closing and opening of hatch covers the present invention is an improvement over the prior art in that a unique latch mechanism is supported on the ends of the hold-down arms which can readily be foot operated for releasing the hold-down arms to a non-engaging position thereby permitting the opening of the hatch covers.

SUMMARY

The present invention relates to an improved foot operated latch mechanism for maintaining hold-down arms of a plurality of trough hatch covers in a closed position, the latch mechanism being readily releasable from said position. The hold-down arms are hingedly supported on the roof of the car and are individually movable over adjacent end portions of hatch covers to seal the space between said ends and to secure the hatch covers over the hatch openings in a closed and locked position. Hold-down arms of the prior art are disclosed in U.S. Pat. No. 3,800,714. Such hold-down arms are provided with resilient sealing elements supported on the lower surface of the arms for engaging adjacent ends of the hatch covers. The hatch covers also include peripherally extending seals which engage upper portions of hatch coaming surrounding the hatch opening for effectively sealing the hatch openings. Each of the arms is provided with a laterally extending extension on which, in the present disclosure, a latch element or mechanism is pivotally mounted. The latch mechanism in the closed position includes a keeper engageable element which engages a keeper member mounted on the roof of the hopper car adjacent the hatch opening. The spring arrangement continually urges the latch mechanism into locking engagement for effectively sealing each of the hatch covers over the opening. The latch mechanism may easily be pivoted by means of the operator's foot to a disengaging position wherein the hold-down arm may then be swung pivotally out of the way of the hatch covers resting thereupon on one side of the hatch opening.

Thus, it is a major object of the present invention to provide a simplified latch mechanism for the hold-down arms of a trough hatch cover which can easily be operated by the foot of an operator who is standing to one side of the hatch cover on the roof of a hopper car.

BRIEF DESCRIPTION OF THE DRAWINGS

FIG. 1 is a plan view of a railway hopper car employing a trough hatch locking arrangement of the present invention;

FIG. 2 is a detailed perspective view of a portion of a railway hopper car roof and hatch cover arrangement including a novel latching mechanism;

DESCRIPTION OF THE PREFERRED EMBODIMENT

Figure 3:
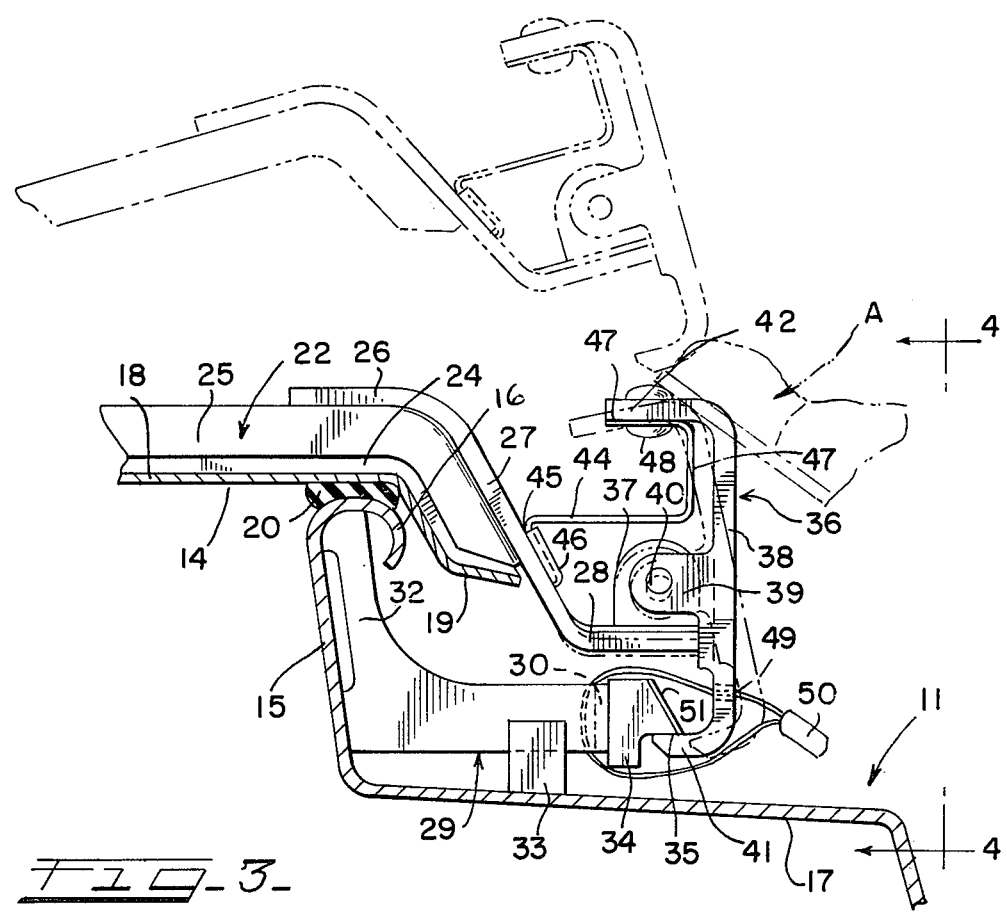
FIG. 3 is a cross sectional view taken substantially along the line 3—3 of FIG. 1.

A railway hopper car 10, as shown in FIG. 1, includes a roof structure 11 having longitudinal extending walkways 12 and laterally extending walkways 13. The roof structure 11 includes a continuous elongated hatch opening 14 which is surrounded by upright coaming walls 15 continuously extending along the periphery of the opening 14. The upper ends of the coaming walls 15 are provided with a continuous arcuate flange 16. The opening 14 is provided in a stepped roof sheet 17 and is closed by means of a plurality of hatch covers generally designated at 18. Each of the hatch covers 18 on one side thereof are provided with downwardly and outwardly projecting flanges 19. A resilient seal 20 supported on the underneath surface of each of the covers 18 is adapted, as best shown in FIGS. 2 and 3, to engage and seal along the flanges 16 for sealing the hatch opening 14. The hatch covers are pivotally supported on the roof structure 11 by means of hinge brackets 21 of conventional design. Thus, each of the hatch covers may be moved from an open position lying on one side of the opening 14 on the stepped roof sheets 17.

As shown in the aforementioned U.S. Pat. No. 3,800,714, hatch covers of this type are adapted to be sealed along adjacent edges by means of U-shaped hold-down arms 22. The hold-down arms 22 also are hingedly mounted on hinge brackets 23 so that they also may be moved to an open position on the roof sheet 17 to one side of the hatch opening 14. The U-shaped hold-down arms 22 include flanges 25 between which a resilient seal 24 is supported. The seal 24 is adapted to engage adjacent edges of the longitudinally adjacent hatch covers 18. Each of the hold-down arms 22 is provided with an outwardly and downwardly extending extension or bracket locking portion 26. The bracket locking portion 26 includes diagonal portion 27 being provided at its lower end with an outwardly extending flange 28.

Figure 4:
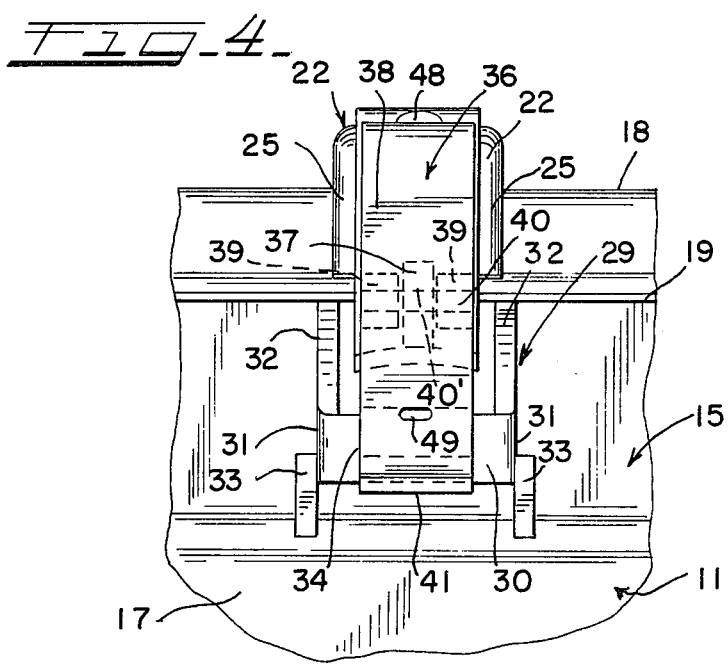
FIG. 4 is an end elevational view taken substantially along the line 4—4 of FIG. 3.

A keeper bracket 29 is provided beneath each of the bracket extensions 27 the same having a U-shaped configuration including an upright front wall 30 integrally connected to rearwardly extending side walls 31. The side walls 31 in turn are integrally connected to upright bracket portions 32 secured to the hatch coaming walls 15 and flange 16, as best shown in FIG. 2. The keeper bracket 29 is supported on the stepped roof sheet 17 by means of supports 33 connected to the front wall 30. The bracket 29 is provided at its forward end with a keeper lug 34 having an undercut portion or keeper surface 35. A latch mechanism for each of the hold-down arms 22 is designated at 36. An upright central pivot bracket 37, best shown in FIGS. 3 and 4, is rigidly secured to the lower flange 28 and projects upwardly with respect thereto. The latch member 36 includes a vertical latch plate or arm 38 having inwardly extending aligned pivot ears 39 which support a pivot pin 40 extending through an opening 40' in pivot bracket 37 as shown in FIG. 4, to permit pivotal movement of the arm 38. The lower end of the arm 38 is provided with a keeper engaging hook or finger 41 which, as shown in FIG. 2, engages in the closed position, the undercut keeper surface or portion 35. The upper end of the arm 38 also includes an inwardly projecting or extending flange 42.

The arm 38 is maintained in the closed position, shown in FIG. 3, by means of a spring arrangement generally designated at 43. The spring arrangement 43 includes a horizontal spring leaf 44 having a downwardly extending portion 45 which is rigidly secured by means of a bracket 46 to the diagonal portion 27 of the locking portion extension 26. Thus, the spring end 45 provides anchoring means with the bracket or anchor plate 46 for rigidly securing the spring to the diagonal portion 27. The spring arrangement 43 also includes a vertically extending leaf portion 47 which, as best shown in FIG. 3, is effectively secured to the horizontal flange 42 by means of a rivet 48. As best shown in FIG. 4, the arm 38 is also provided with a car seal aperture 49 and a car seal 50, as shown in FIG. 3, is adapted to be inserted through the aperture 49 wound about the keeper member 34 and front wall 30 for securing the latch mechanism 36 in the locked position shown in FIG. 3.

THE OPERATION

The hatch opening 14 is continuous substantially the length of the roof structure 11 and as indicated, four individual hatch covers are provided each of which can be individually hinged on the brackets 21 and each of which can be locked and sealed by means of the hold-down arms 22 which in the positions shown are closed by means of the latch mechanisms 36 in sealing relation. In order to open the hold-down arms 36 and to pivot them in a counterclockwise direction as shown in FIG. 3, it is a simple matter for the operator to place one of his feet on the upper end of the latch mechanism 36 whereby the same, as shown by the dotted line position, can be pivoted about the hinge pin 40 to a position wherein the keeper engaging hook or finger 41 is released from the undercut portion or keeper surface 35. Because of the resiliency of the seals 20 and 24 the covers 18 and the hold-down arms 22 are immediately urged upwardly and the operator can now manually pivot the arms and the covers to their out-of-the-way position to one side of the hatch opening. The spring arrangement 43 continually urges the latch members or mechanisms 36 to the closed position so that in order to automatically and efficiently again lock the hatch covers in a closed position, it is a simple matter to pivot the covers and hold-down arms back to their closed position, shown in FIGS. 2, 3 and 4. Then, by pressing downwardly on the hold-down arms 22 and hatch covers 18, the seals 20 and 22 are again compressed and the hook 41 slides downwardly on the inclined surface 51 of the keeper member 34 until it reaches the undercut portion 35 whereupon the spring provides for engagement of the finger 41 with the undercut portion 35 to again securely lock the hold-down arms 22 and hatch covers 18 in the closed position.

What is claimed is:

1. A locking device for use in a railway hopper car having a roof with a hatch opening defined by an upstanding coaming, the improvement comprising:
    hatch cover means movable to an open position at one side of the opening and to a closed position over the opening;
    resilient means interposed between the coaming and the hatch cover means for biasing the hatch cover means upwardly in the closed position thereof;
    hold-down means adapted to move pivotally between locked and unlocked positions with respect to said hatch cover means;
    locking means pivotally attached about a generally horizontal axis to said hold-down means for positioning in the locked position of the hold-down means overlapping the hatch cover means at one side of the hatch cover means;
    said locking means comprising an upper footengageable portion, and a lower keeper finger;
    keeper lug means mounted on the roof beneath said locking means and having means engageable with the keeper finger to secure the hold-down means attendant to said hold-down means being positioned in locking position;
    said keeper finger adapted to be disposed beneath said keeper lug means and said resilient means biasing said lug means and keeper finger into engaged position; and
    said locking means being movable downwardly with said hold-down means upon said foot portion being depressed against the resistance of said resilient means to release said finger from said keeper lug.

2. The locking device according to claim 1, wherein said locking means includes:
    means for urging the lower, keeper finger into locking engagement with the keeper lug means.

3. The locking device according to claim 2, and
    spring means interposed between said hold-down means and said locking means for pivoting said locking means in a direction urging the lower keeper finger into locking contact with the keeper lug means.

4. The locking device according to claim 1, wherein said keeper lug means comprises:
    a bracket attached to the coaming;
    said bracket having a front wall and leg means extending therefrom to the coaming; and
    means supporting the leg means intermediate the front wall and the coaming.

5. The locking device of claim 4, wherein said keeper lug means comprises;
    means mounted to said front wall of the bracket means having an upwardly facing outwardly inclined cam surface;
    a downwardly facing locking keeper surface disposed below said cam surface; and
    said keeper finger of said locking means having means cooperative with the inclined cam surface for automatically pivoting the locking means past the cam surface and into a locked positioned in contact with the locking keeper surface.

6. The invention according to claim 1 wherein:
    said locking means includes means for attaching a railway car seal.

7. The invention according to claim 1 and said foot portion comprises a horizontal flange and a leaf spring shielded by the flange and reactively stressed between the locking means and the hold-down means for releasably biasing said locking means to hold the keeper finger beneath the keeper lug means.

8. The invention according to claim 7 and said leaf spring being essentially Z-shaped and having one end connected to the hold-down means and the other end to the horizontal flange.

9. The invention according to claim 1, wherein:
    said hold-down means comprising a resilient elastomer material adapted to be compressed against said hatch cover means whereby said hold-down means is biased upwardly with respect to the hatch cover means to augment the action of said resilient means interposed between the hatch cover means and the coaming.

* * * * *